United States Patent
Chou

(10) Patent No.: US 6,682,053 B1
(45) Date of Patent: Jan. 27, 2004

(54) WINCH OF A LASHING ROPE

(76) Inventor: An-Chuan Chou, No. 212, Yung An Street, Tainan (TW)

(*) Notice: Subject to any disclaimer, the term of this patent is extended or adjusted under 35 U.S.C. 154(b) by 0 days.

(21) Appl. No.: 10/287,647

(22) Filed: Nov. 5, 2002

(51) Int. Cl.[7] ............................ B21F 9/00; B25B 25/00; B66F 3/00
(52) U.S. Cl. ........................ 254/218; 254/238; 24/68 R; 24/68 CD
(58) Field of Search ................................ 254/218, 237, 254/238, 243; 24/68 R, 70 ST, 69 ST, 68 CD

(56) References Cited

U.S. PATENT DOCUMENTS

| | | | | |
|---|---|---|---|---|
| 3,703,024 A | * | 11/1972 | Johnson | .................... 24/68 CD |
| 4,227,286 A | * | 10/1980 | Holmberg | ................ 24/68 CD |
| 5,416,952 A | * | 5/1995 | Dodge | ........................ 24/68 R |
| 5,943,742 A | * | 8/1999 | Huang | ...................... 24/68 CD |
| 6,457,701 B1 | * | 10/2002 | Huang | ......................... 254/217 |

* cited by examiner

*Primary Examiner*—Emmanuel Marcelo
(74) *Attorney, Agent, or Firm*—Rosenberg, Klein & Lee

(57) ABSTRACT

A protective pad made of soft materials is joined to a metallic finger-operated element of a winch for a lashing rope. The finger-operated element has a flat main body, and two spaced-apart plate portions, which stick outwards substantially perpendicular to the main body to be pushed for allowing the winch to be moved to a locked position. A portion of the protective pad covers the plate portions. Thus, a user doesn't have to contact the metallic finger-operated element directly in using the winch, eliminating the risk of the fingers getting hurt by sharp edges of the metallic element. Being made of soft materials, the protective pad is to provide the user with more comfortable touch than the relatively hard plate portions of the metallic element in operating the winch.

5 Claims, 6 Drawing Sheets

WINCH OF A LASHING ROPE

BACKGROUND OF THE INVENTION

1. Field of the Invention

The present invention relates to a winch of a lashing rope, more particularly a winch, which is operated for stretching the lashing rope by means of pivoting a lever to and fro with hands, and which is provided with a finger operated element that is safe and comfortable to use.

2. Brief Description of the Prior Art

A lashing rope winch is usually used for fastening cargo onto a truck with. Referring to FIGS. 5, and 6, a conventional winch 2 of a lashing rope includes a shaft 21, two ratchets 22, a support base 23, and an operating member 24.

The support base 23 has two opposing lateral plates 23, a connecting rod (not numbered) connected to outer ends of the lateral plates 23. The lateral plates of the support base 23 have opposing pivotal holes at inner ends thereof and have opposing elongated holes 233 that are formed along middle portions thereof. In addition, the lateral plates of the support base 23 have convexly curved sections 235, and locating gaps 236 on the inner ends. A first engaging plate 231 is movably fitted to the support base 23 with engaging projections 234 sticking out from respective elongated holes 233 of the lateral plates. A spring 232 is connected to the first engaging plate 231 to bias the same towards the inner end of the support base 23.

The shaft 21 is turnably passed through the pivotal holes of the lateral plates of the support base .23 at two ends. The shaft 21 has connecting slot 211 lengthways formed thereon for allowing a lashing rope to be connected thereto. The ratchets 22 are connected to a respective end of the shaft 21 so that they can turn together with the shaft 21.

The operating member 24 has two opposing lateral lever portions, and has opposing elongated holes (not numbered) lengthways formed on the lateral lever portions thereof The operating member 24 is pivotally connected to the shaft 21 at inner ends of the lateral lever portions thereof.

A second engaging plate 242 is movably fitted to the operating member 24 with two lateral edges being passed through respective elongated holes of the lever portions. The second engaging plate 242 has engaging projections 243 sticking out to engage the ratchets 22, and is connected to a spring 241 to be biased towards the inner end of the operating member 24. In addition, the second engaging plate 242 has two finger operated plate portions 244 sticking outwards substantially perpendicular to the main surface thereof.

Thus, the first engaging plate 231 is forced to engage the ratchets 22 at the engaging projections 234 by the spring 232, and the second engaging plate 242 is forced to engage the ratchets 22 at the engaging projections 243 thereof by the spring 241.

In using the winch, a first rope is connected to an edge of the deck of a truck and the connecting rod of the support base 23 at two ends. And, a second rope is connected to the opposite edge of the truck deck and the shaft 21 at tow ends, and is passed over the cargo on the truck. Then, the operating member 24 is pivoted to and fro to turn the ratchets 22 and the shaft 21 for the second rope to be wound around the shaft 21. Thus, the ropes are stretched to fasten the cargo tightly onto the truck.

After the lashing operation is finished, the second engaging plate 242 is moved for the engaging projections 243 to be disengaged from the ratchets 22 by means of pushing the finger operated plate portions 244 with fingers, and the operating member 24 is pivoted past the convexly curved sections 235 of the support base 23 to a locked position where the inner ends of the lever portions engage the locating gaps 236 of the support base 23. Thus, the operating member 24 is locked, and the second rope is secured in position. To unlock the second engaging plate 242 for the same to become operable again, first the finger operated plate portions 244 are pushed for disengaging the engaging projections 243 of the second engaging plate 242 from the locating gaps 236, and then the second engaging plate 242 is pivoted past the convexly curved sections 235. Finally, the plate portions 244 are released so that the second engaging plate 242 is forced to engage the ratchets 22 by the spring 241.

The user has to push the plate portions 244 with fingers very often. However, the finger operated plate portions 244 are found to have disadvantages as followings:

1. The second engaging plate 242 is made of metal therefore the finger operated portions 244 of the plate 242 are relatively hard, making the users feel uncomfortable when the users press them with fingers.

And, the finger operated portions 244 have very small dimensions, e.g. 1 cm long each side. Consequently, a lot of pressure will be placed on those portions of a user's fingers in contact with the finger-operated portions 244 when the user is pushing the engaging plate 242, causing the user to feel uncomfortable.

2. When the user is pushing the engaging plate 242, the metallic finger-operated portions 244 are likely to hurt the user's fingers with sharp edges formed thereon.

SUMMARY OF INVENTION

It is a main object of the present invention to provide a winch for a lashing rope, which is safe and comfortable to use.

It is another object of the present invention to provide a protective pad to a finger-operated element of a winch of a lashing rope that can't easily fall off the winch when used.

The winch of a lashing rope according to the present invention includes a protective pad made of soft materials, which is joined to a metallic finger-operated element. The finger-operated element has a flat main body, and two spaced-apart plate portions, which are to be pushed for allowing the winch to be moved to a locked position. The plate portions stick outwards perpendicular to the main body. The protective pad is joined to the finger-operated element with a portion thereof covering the plate portions so that a user doesn't have to contact the metallic plate portions directly in operating the finger-operated element.

BRIEF DESCRIPTION OF THE DRAWINGS

The present invention will be better understood by reference to the accompanying drawings, wherein.

DETAILED DESCRIPTION OF THE PREFERRED EMBODIMENTS

Figure 1:
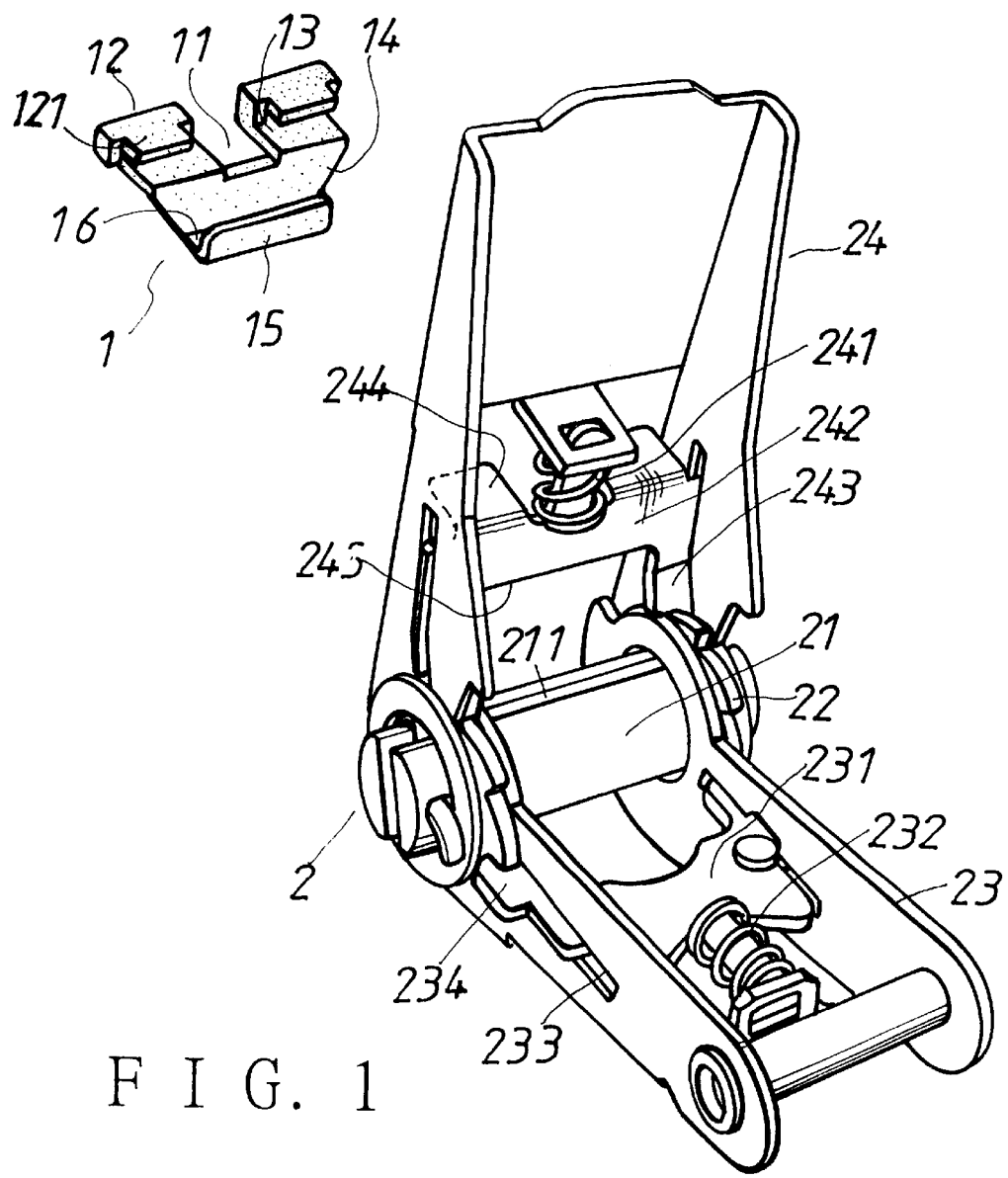
FIG. 1 is a perspective view of a winch for a lashing rope and the protective pad according to the present invention.
Figure 2:
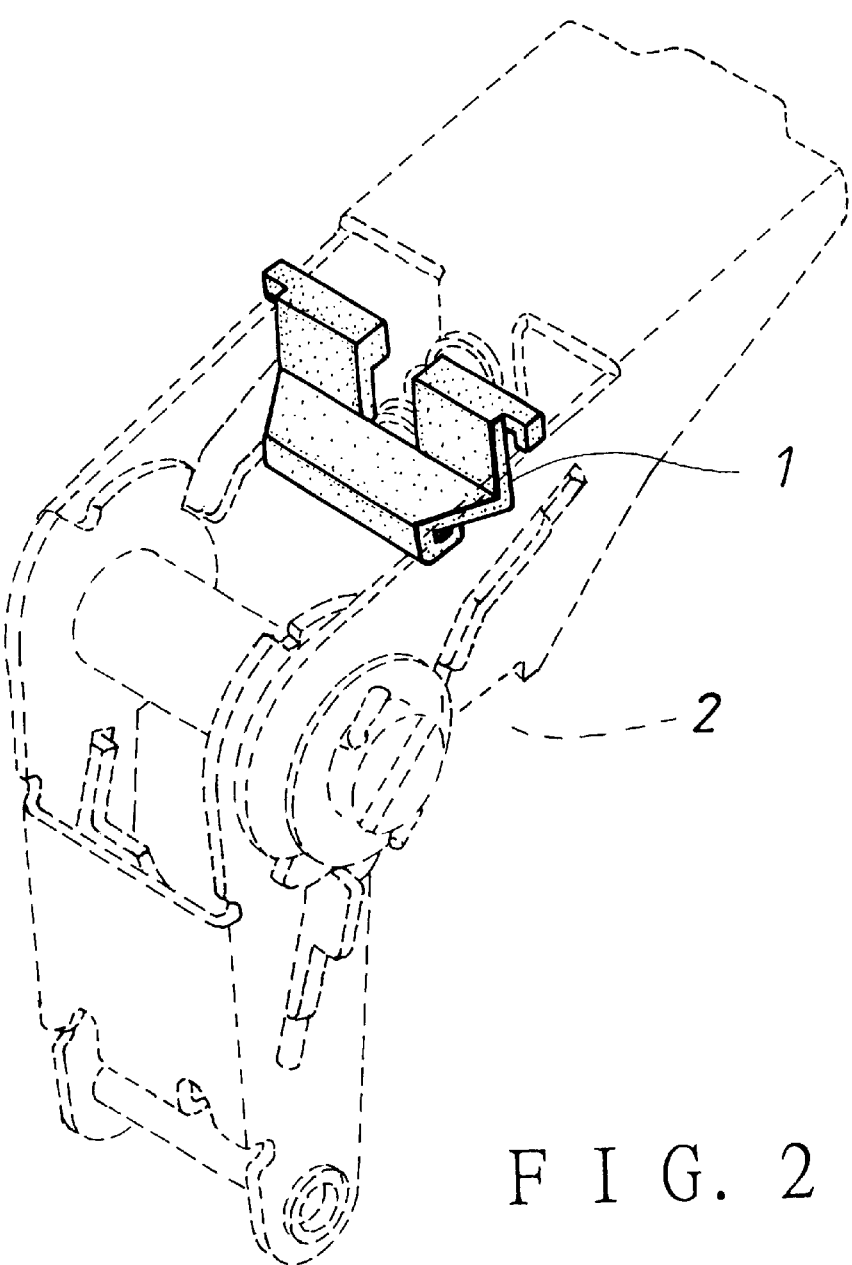
FIG. 2 is a perspective view of a winch for a lashing rope with the protective pad being fitted thereto according to the present invention.
Figure 3:
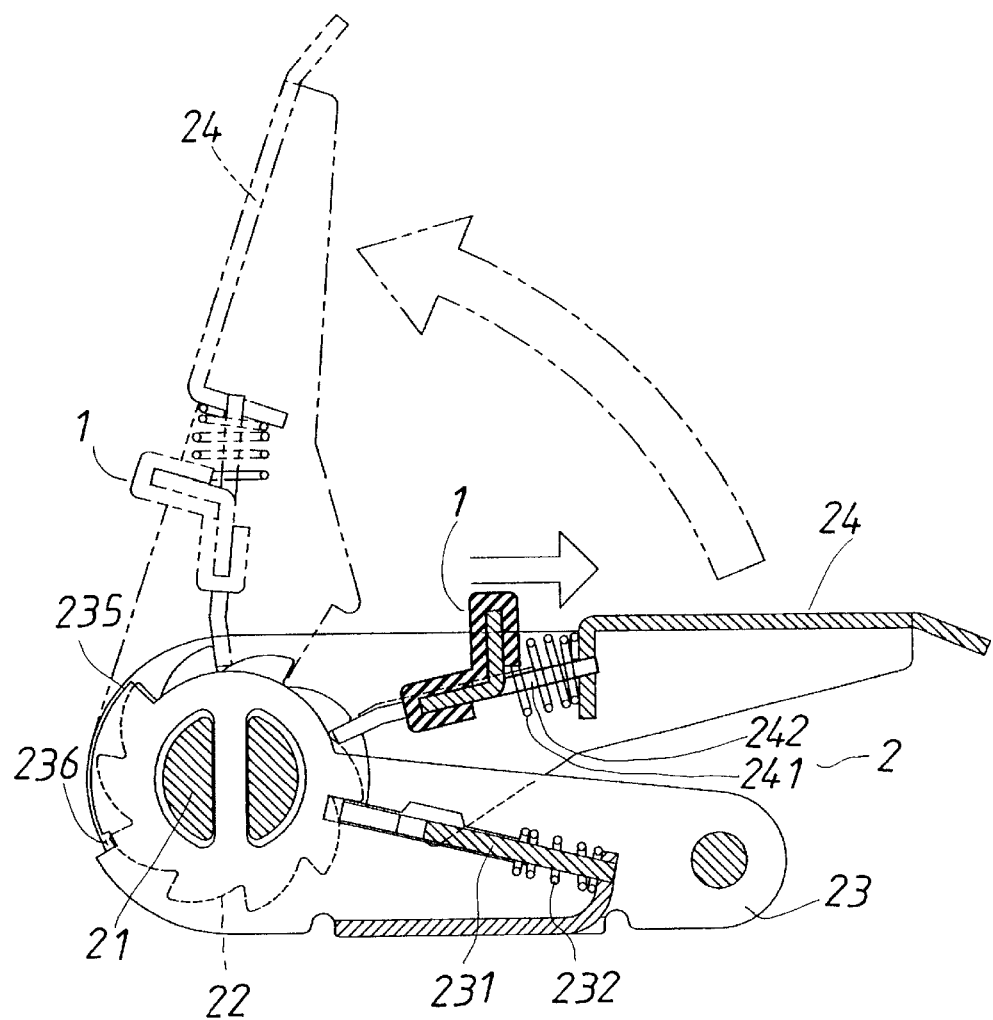
FIG. 3 is a cross-sectional view of a winch for a lashing rope with the protective pad being fitted thereto according to the present invention.
Figure 4:
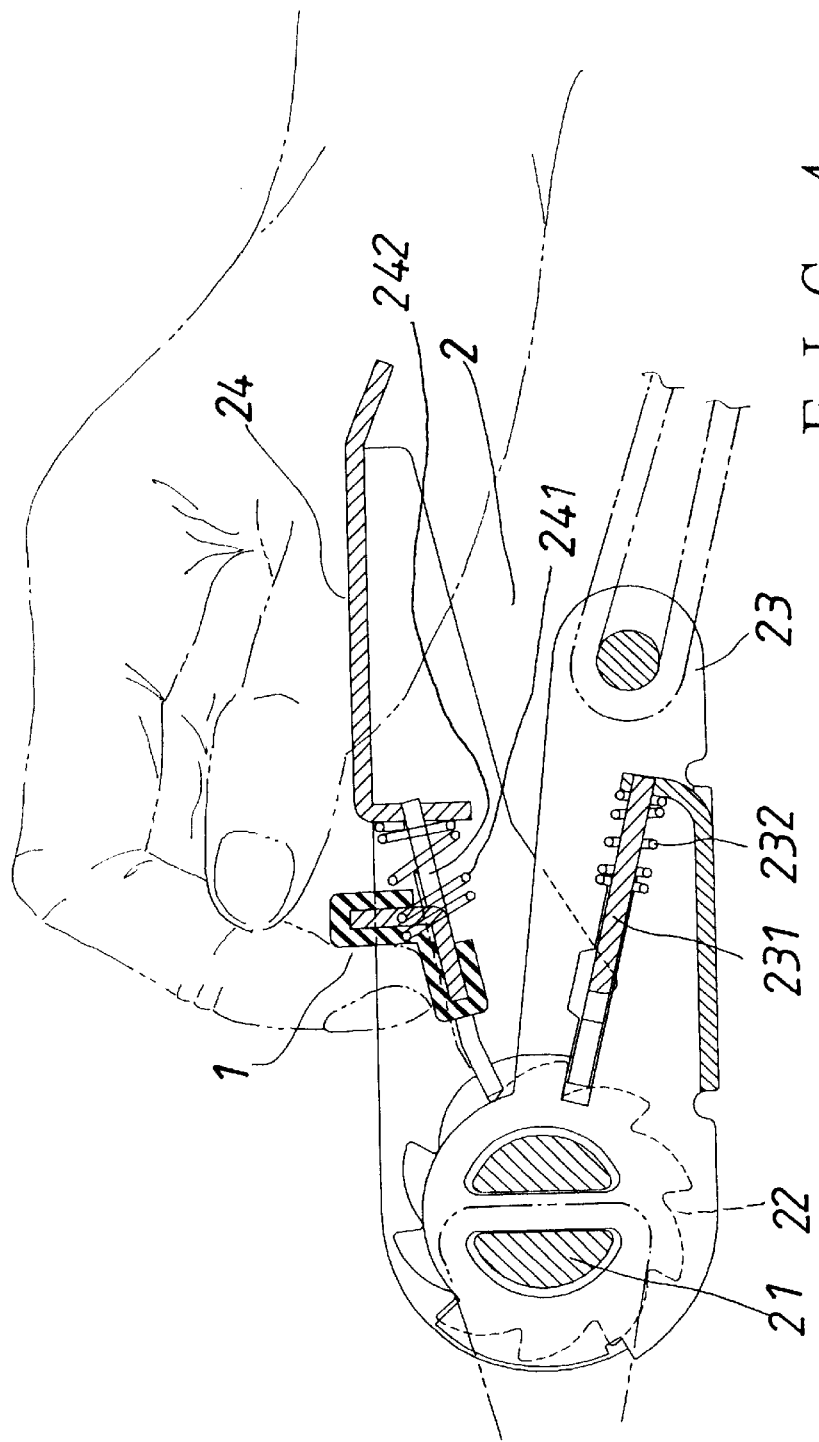
FIG. 4 is a view showing the usage of the protective pad according to the present invention.
Figure 5:
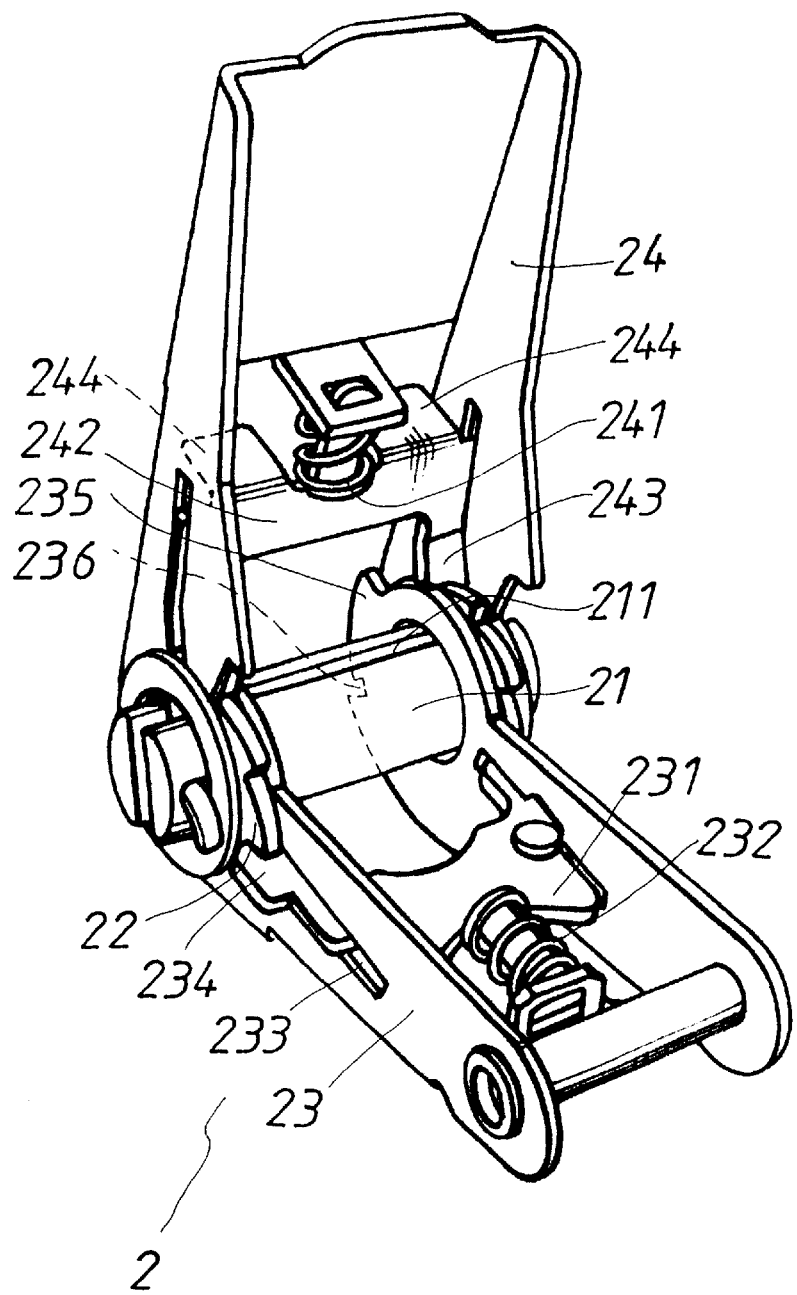
FIG. 5 is a perspective view of the conventional winch for a lashing rope as described in the Background; and, FIG. 6 is a cross-sectional view of the conventional winch for a lashing rope.
Figure 6:
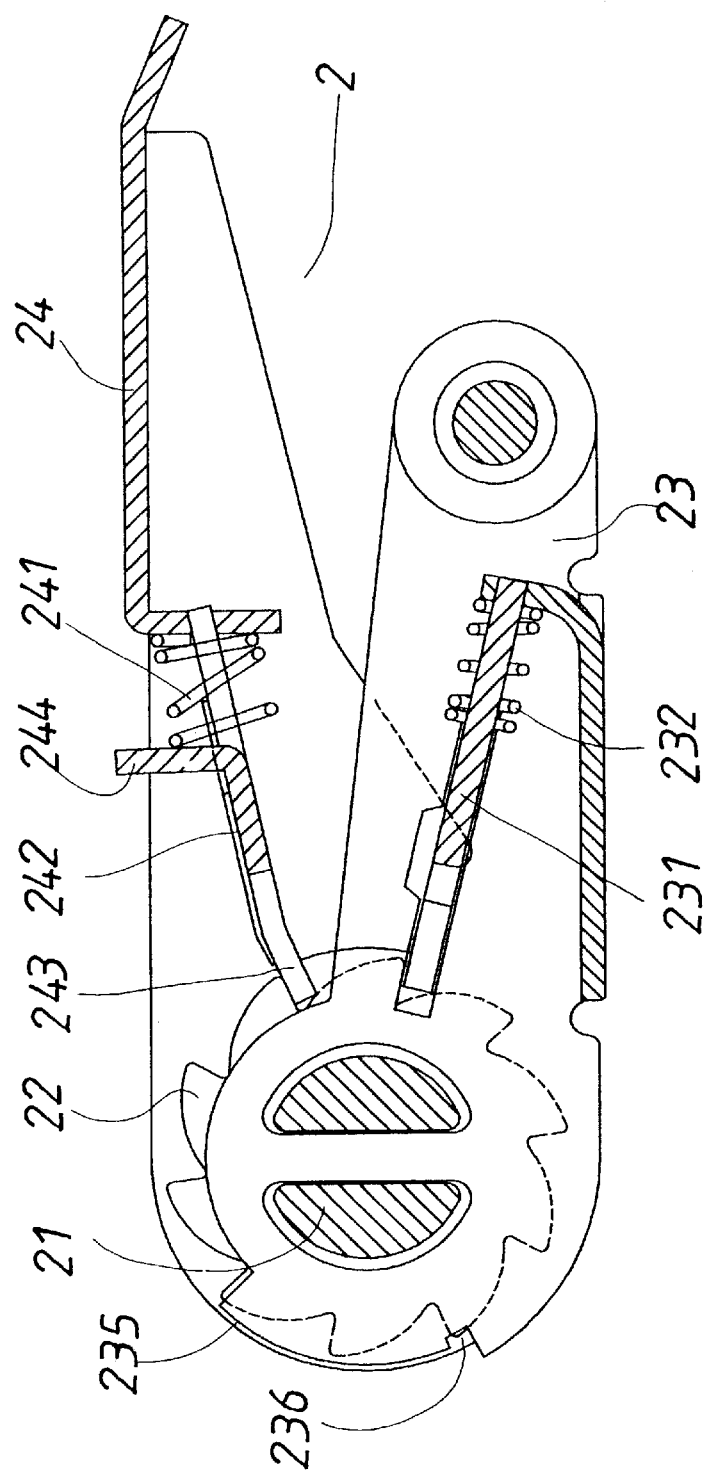

Referring to FIG. 1, a winch for a lashing rope of the present invention includes a shaft 21, two ratchets 22, a support base 23, an operating member 24, and a protective pad 1.

The support base 23 has two opposing lateral plates 23, a connecting rod (not numbered) connected to outer ends of the lateral plates 23. The lateral plates of the support base 23 have opposing pivotal holes at inner ends thereof and have opposing elongated holes 233 that are formed along middle portions thereof. In addition, the lateral plates of the support base 23 have convexly curved sections 235, and locating gaps 236 on the inner ends. A first engaging plate 231 is movably fitted to the support base 23 with engaging projections 234 sticking out from respective elongated holes 233 of the lateral plates. A spring 232 is connected to the first engaging plate 231 to bias the same towards the inner end of the support base 23.

The shaft 21 is turnably passed through the pivotal holes of the lateral plates of the support base 23 at two ends. The shaft 21 has connecting slot 211 lengthways formed thereon for allowing a lashing rope to be connected thereto. The ratchets 22 are connected to a respective end of the shaft 21 so that they can turn together with the shaft 21.

The operating member 24 has two opposing lateral lever portions, and has opposing elongated holes (not numbered) lengthways formed on the lateral lever portions thereof. The operating member 24 is pivotally connected to the shaft 21 at inner ends of the lateral lever portions thereof.

A second engaging plate 242 is movably fitted to the operating member 24 with two lateral edges being passed through respective elongated holes of the lever portions. The second engaging plate 242 has engaging projections 243 sticking out to engage the ratchets 22, and is connected to a spring 241 to be biased towards the inner end of the operating member 24. In addition, the second engaging plate 242 includes a main flat body, which has an inward edge facing the shaft 21, and two finger operated plate portions 244 sticking outwards substantially perpendicular to the main flat body thereof.

The protective pad 2 is made of an elastic material, e.g. soft plastic, rubber, and silicone. The protective pad 2 includes a first connecting portion, and two second connecting portions 12. The first connecting portion has a main body, which has two sloping edges 14, and an elongated flange 15, which is formed substantially parallel to the main body thereof to define a first engaging trench 16 together with the main body.

The second connecting portions 12 are juxtaposed with a space 11 provided in between. Each of the second connecting portions 12 has a main body sticking perpendicular to the main body of the first connecting portion, and a projection 121, which is formed substantially parallel to the corresponding main body to define a second engaging trench 13 together with the corresponding main body.

The protective pad 1 is joined to the second engaging plate 242 with the first connecting portion being mounted onto the inward edge of the second engaging plate 242, and with the second connecting portions 12 being mounted onto respective finger-operated plate portions 244 so that the finger-operated plate portions 244 are covered by the second connecting portions 12.

Thus, the first engaging plate 231 is forced to engage the ratchets 22 at the engaging projections 234 by the spring 232, and the second engaging plate 242 is forced to engage the ratchets 22 at the engaging projections 243 thereof by the spring 241.

In using the winch, a first rope is connected to an edge of the deck of a truck and the connecting rod of the support base 23 at two ends. And, a second rope is connected to the opposite edge of the truck deck and the shaft 21 at tow ends, and is passed over the cargo on the truck. Then, the operating member 24 is pivoted to and fro to turn the ratchets 22 and the shaft 21 for the second rope to be wound around the shaft 21. Thus, the ropes are stretched to fasten the cargo tightly onto the truck.

After the lashing operation is finished, the second engaging plate 242 is moved for the engaging projections 243 to be disengaged from the ratchets 22 by means of pushing the protective pad 1 with fingers, and the operating member 24 is pivoted past the convexly curved sections 235 of the support base 23 to a locked position where the inner ends of the lever portions of the operating member 24 engage the locating gaps 236 of the support base 23. Thus, the operating member 24 is locked, and the second rope is secured in position. To unlock the second engaging plate 242 for the same to become operable again, first the protective pad 1 is pushed for disengaging the engaging projections 243 of the second engaging plate 242 from the locating gaps 236, and then the second engaging plate 242 is pivoted past the convexly curved sections 235. Finally, the protective pad 1 is released so that the second engaging plate 242 is forced to engage the ratchets 22 by the spring 241.

From the above description, it can be easily understood that the winch of a lashing rope of the present invention is safe and more comfortable to use because the metallic finger-operated plate portions 244 of the second engaging plate 242 are covered with the protective pad 1, not contacting the user's fingers directly when the winch is being operated. And, because the second connecting portions 12 are formed substantially perpendicular to the first one, the protective pad 1 can be securely connected to the second engaging plate 242 without possibility of falling off.

What is claimed is:

1. A protective pad of a winch for a lashing rope, the winch comprising:

a support base having two opposing lateral plates; the support base having a first engaging plate movably fitted thereto and biased towards inner ends of the opposing lateral plates thereof by a first spring;

a shaft passed through the inner ends of the opposing lateral plates of the support base for allowing one end of a lashing rope to be wound around it to be stretched in a lashing operation;

two ratchets connected to two ends of the shaft to turn together with the shaft, and, an operating member pivotally connected to the shaft at inner ends of opposing lateral lever portions thereof; the operating member having a second engaging plate movably fitted thereto and biased towards an inner end thereof by a second spring to engage the ratchets; the second engaging plate including a main flat body having an inward edge facing the shaft, and a plurality of finger-operated plate portions sticking outwards substantially perpendicular to the main flat body thereof;

the protective pad being made of an elastic material, and including a first connecting portion, and a plurality of second connecting portions; the protective pad being joined to the second engaging plate with the first connecting portion, and the second connecting portions being mounted onto the inward edge, and the finger-operated plate portions of the second engaging plate respectively so that the finger-operated plate portions are covered by the second connecting portions.

2. The protective pad of a winch for a lashing rope as claimed in claim 1, wherein the first connecting portion of the protective pad includes an elongated flange, which is formed substantially parallel to a main body of the first connecting portion to define a first engaging trench together with the main body, and each of the second connecting portions has a main body sticking perpendicular to the main body of the first connecting portion, and a projection, which is formed substantially parallel to the main body of the second connecting portion to define a second engaging trench together with the corresponding main body.

3. The protective pad of a winch for a lashing rope as claimed in claim 1, wherein the elastic material is soft plastic.

4. The protective pad of a winch for a lashing rope as claimed in claim 1, wherein the elastic material is rubber.

5. The protective pad of a winch for a lashing rope as claimed in claim 1, wherein the elastic material is silicone.

* * * * *